Sept. 26, 1933.  W. C. DEAN  1,927,923
AUTOMATIC ENGINE CONTROL FOR SHIPS
Filed March 1, 1932
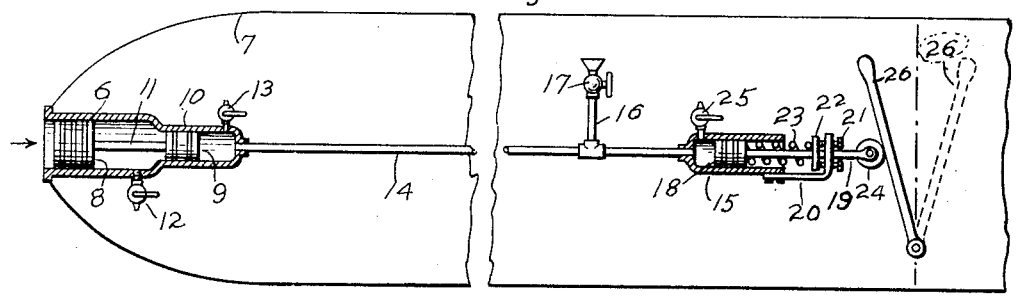
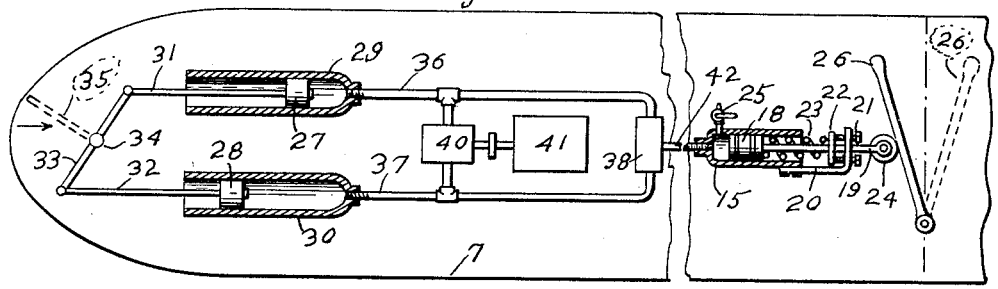
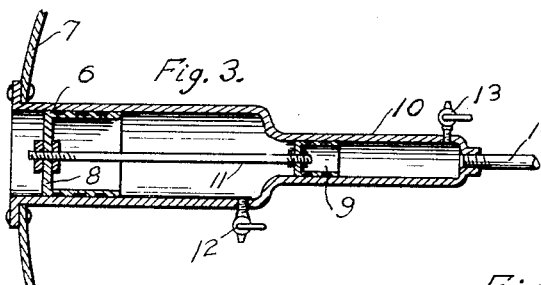
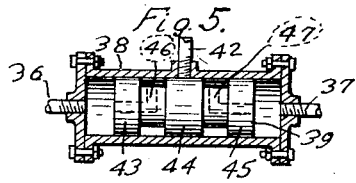
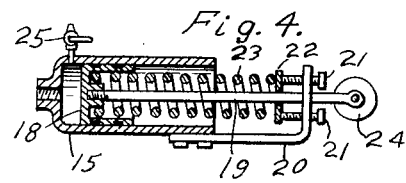
INVENTOR
Walter C. Dean.
BY
Robert A. Lavender
ATTORNEY

UNITED STATES PATENT OFFICE 1,927,923

AUTOMATIC ENGINE CONTROL FOR SHIPS

Walter C. Dean, Chevy Chase, Md.

Application March 1, 1932. Serial No. 596,087

9 Claims. (Cl. 115—1)

(Granted under the Act of March 3, 1883, as amended April 30, 1928; 370 O. G. 757)

This invention relates to means for controlling automatically the speed of a vessel, and has for its object to provide a mechanism actuated by pressure of the water in which the vessel is in motion to prevent movement of the ship at more than a predetermined maximum speed.

With the above and other objects in view, the invention consists in the construction, combination and arrangement of parts as will be described more fully hereinafter.

Reference is to be had to the accompanying drawing forming a part of this specification, in which like reference characters indicate corresponding parts throughout the several views, and in which:

Fig. 1 is a schematic representation of one form of my invention operated directly by the water pressure;

Fig. 2 is a like view of an embodiment wherein the torque set up by water pressure on the rudder when moving in reverse actuates the control;

Fig. 3 is an enlarged sectional detail view of the primary cylinder and the piston therein;

Fig. 4 is a similar view of the secondary cylinder and associated parts;

Fig. 5 is a longitudinal sectional view of the shuttle valve.

It is a well known fact that the most severe stresses applied to the steering gear of a vessel are developed while backing. Depending upon the speed, shape and displacement of the ship, upon the shape, position, area and design of the rudder, and possibly upon other variables also, the power required to operate the rudder when moving astern is frequently three times that necessary when going ahead.

Backing is seldom required, yet the steering mechanism must be powerful enough to meet this condition, that is, the steering gear must be two or three times as powerful as is necessary under normal conditions, which is extravagant of cost, space, weight, and power. Further, high speeds in backing may have the undesirable result of submerging the stern.

In backing a vessel it is seldom that high speed is necessary, but a powerful reverse action of the propeller is necessarily available for stopping. Continued application of the same power after the forward way of the craft has been overcome will result in a high speed astern, thus imposing severe stresses upon the steering gear. Therefore, while it must be possible to utilize the full power of the engines in reverse for stopping, it is highly desirable that automatic means be provided to move the engine controls to prevent the speed astern from becoming greater than a predetermined maximum. This my invention does with minimum weight and number of working parts, resulting in reliability, simplicity, and low cost.

The hydraulic pressure developed at the stern of the vessel when backing is utilized to operate the control of the propelling machinery. It is to be understood that in any case where it might for any reason be desirable to fix a maximum speed ahead the apparatus now to be described may be installed in the bow. At the stern of the ship a cylinder 6 has a water tight fit in an aperture through the skin 7 of the vessel below the water line with its outer end opening directly into the water. Piston 8 is slidably mounted in this portion of the cylinder and is connected to a smaller piston 9 in reduced portion 10 of the cylinder by a rod 11. Drain cock 12 is provided to remove from cylinder 6 any water or oil that may gain access to the space between the two pistons, and an air vent cock 13 permits the escape of air from the reduced portion 10 when filling the system with oil, as hereinafter described.

The interior of reduced portion 10 is connected by pipe 14 to the interior of secondary cylinder 15 and is provided with a funnel stand-pipe 16 controlled by valve 17 for supplying oil to the device. Slidable in secondary cylinder 15 is a piston 18 connected to a push rod 19 that has a roller 24 or other suitable contact device at its outer end. Rod 19 slides through a guide bracket 20 in which are mounted screws 21 that bear against a plate 22 on rod 19 to adjust the compressive force applied to loading spring 23 which tends to push piston 18 into cylinder 15 and thus prevent any appreciable outward movement of rod 19 until a predetermined minimum pressure is applied to piston 18. An air vent cock 25 is provided to permit the escape of air from cylinder 15 when filling.

Spring 23 normally keeps push rod 19 retracted so that control lever 26 may be moved back to give full reverse power for stopping the ship or beginning to back, but as soon as the movement astern reaches the predetermined speed the pressure of the water drives piston 8 inwardly and, by means of piston 9, applies pressure to the oil in reduced portion 10, pipe 14 and cylinder 15. This moves piston 18 outwardly against the pressure of spring 23 and by push rod 19 and roller 24 moves lever 26 forward which reduces the power of the engines.

The modification of my invention shown in Fig. 2 is adapted for use on ships equipped with hydraulic means for operating the steering gear. Pistons 27 and 28 in cylinders 29 and 30 are fixed on rods 31 and 32 that are pivotally connected to the respective ends of yoke 33 mounted on rudder post 34 to control rudder 35. Pressure pipes 36 and 37 are respectively connected to cylinders 29 and 30 and to the opposite ends of casing 38 of shuttle valve 39. Reversible pump 40 driven by motor 41 is connected to both of pipes 36 and 37. An outlet pipe 42 connects the interior of casing 38 with a cylinder 15 in which is a piston 18 for the purpose previously described in connection with like parts in Fig. 1. Shuttle valve 39 has three spaced-apart heads 43, 44, 45, with a groove between each two, and ducts 46 and 47 leading from the end faces of the valve to the adjacent grooves. When pressure is applied to one of the end heads of the valve the valve is shifted longitudinally and the duct opening on the end to which the pressure is applied is placed in communication with the outlet pipe 42.

If a vessel equipped with the invention shown in Fig. 2 is backing with the rudder amidship no pressure will be developed in cylinders 29 and 30 and a high speed may be attained, but any lateral deflection of the rudder from the mid position will subject one of its faces to pressure and the device will be actuated to move the control lever 26 toward the neutral position. When the rudder is turned as shown in Fig. 2 the torque on rudder post 34 due to the water pressure will be transmitted to piston 27; the pressure in cylinder 29 will act upon head 43 and move valve 39 to place duct 46 in communication with outlet pipe 42 and thus subject piston 18 to a force that will move push rod 19 outwardly and shift lever 26 to cut off the power of the engines proportionately to the pressure on the rudder. When the vessel is moving ahead motor 41 and pump 40 are used to exert pressure on one or the other of pistons 27 and 28 to move the rudder over.

It is understood that the dimensions of the various parts will be such as to effect the greatest economy in space and weight and in the hydraulic fluid used for transmitting the pressure between the several members as is consistent with efficient operation.

The form of the invention shown in Fig. 1 may be installed in the bow of a ship to limit the forward speed thereof if conditions in any particular case render such a course necessary or desirable.

It will be understood that the above description and accompanying drawing comprehend only the general and preferred embodiment of my invention, and that various changes in construction, proportion and arrangement of parts may be made within the scope of the appended claims without sacrificing any of the advantages of my invention.

The invention described herein may be manufactured and used by or for the Government of the United States for governmental purposes without the payment of any royalty thereon.

I claim:

1. In a device of the class described, a primary cylinder fitted into the skin of a ship below water line and opening outwardly into the water, said cylinder having a portion of reduced diameter, a piston movable in said cylinder, a second piston movable in said reduced portion and connected to said first piston, a secondary cylinder, a pipe connecting said secondary cylinder and the reduced portion of said primary cylinder, a third piston movable in said secondary cylinder, a push rod connected to said third piston, a roller mounted on the outer end of said push rod, a bracket attached to said secondary cylinder to support said push rod, a plate mounted on said push rod, screws mounted in said bracket to move said plate, a spring around said rod between said third piston and said plate, and a control lever mounted to be contactible by said roller when said lever is in the reverse position.

2. In a device of the class described, a pair of cylinders, a piston in each cylinder, a rudder yoke, means connecting each of said pistons to an end of said yoke, a rudder movable by said yoke, a pipe connected to each of said cylinders to convey liquid to operate said pistons, a valve casing having one end connected to each of said pipes, a shuttle valve in said casing, said valve having a plurality of grooves therein and a duct from each end opening into the adjacent groove, an outlet pipe from said casing, adapted to be placed in communication with either of said ducts, a cylinder connected to said outlet pipe, a piston in said cylinder, a bracket secured to said cylinder, a push rod slidably carried by said bracket and connected to said last mentioned piston, a plate disposed on said rod, screws mounted in said bracket to move said plate, and a spring disposed around said rod between said last mentioned piston and said plate.

3. In a device of the class described, a primary cylinder opening outwardly through the skin of a ship below water line, said cylinder having a reduced portion, a first piston in said cylinder, a second piston in said reduced portion connected to said first piston, a secondary cylinder, a third piston therein, a push rod connected to said third piston, resilient means to resist outward movement of said push rod, and means connecting the interior of said reduced portion with the interior of said secondary cylinder.

4. The combination with a control lever for the propelling mechanism of a ship, of a cylinder, a piston therein, a push rod connected to said piston, said push rod being disposed to actuate said control lever when moved outwardly, resilient means to resist outward movement of said push rod and means adapted to transmit the hydraulic pressure of water caused by movement of the ship through the water.

5. The combination with the skin of a ship and a control lever for the propelling mechanism of the ship, of a cylinder opening outwardly through the skin, a piston in said cylinder and hydraulically actuatable pressure amplifying means to transmit the pressure on said piston due to movement of said ship through the water directly to actuate said control lever.

6. The combination with the rudder, rudder yoke and a control lever for the propelling mechanism of a ship, of a pair of cylinders, a piston in each cylinder, means connecting each piston to an end of said yoke, means to set up directional pressure in said cylinders, hydraulically operable means disposed to move said control lever and means to transmit to said hydraulically operable means pressure developed in either of said cylinders by an external pressure exerted against said rudder.

7. The combination with the rudder and a control lever for the propelling mechanism of a ship, of hydraulic means to put said rudder over, a cylinder, a piston in said cylinder, means to actuate said lever connected to said piston and means connecting said cylinder with said hydraulic means whereby external pressure on said rudder tending to move said rudder farther from a true fore-and-aft position will be transmitted to said cylinder to act upon said piston.

8. The combination with the rudder and a control lever for the propelling mechanism of a ship, of a cylinder, a piston therein, means to actuate said lever connected to said piston, movable means in contact with the water outside the ship and hydraulic means to transmit to said cylinder the force exerted on said movable means due to movement through the water and thereby control the driving effort of the ship's propelling mechanism.

9. The combination with the rudder and a control lever for the propelling mechanism of the ship, of a cylinder, a piston in said cylinder, means connected to said piston to actuate said lever, movable means in contact with the water outside the ship and means to transmit to said cylinder the force exerted on said movable means due to movement through the water and thereby control the driving effort of the ship's propelling mechanism.

WALTER C. DEAN.